United States Patent [19]

Medemblik et al.

[11] Patent Number: 5,035,543
[45] Date of Patent: Jul. 30, 1991

[54] MATERIAL TRANSFER APPARATUS

[75] Inventors: John J. Medemblik; William Devries, both of Fergus, Canada

[73] Assignee: Walinga Inc., Guelph, Canada

[21] Appl. No.: 377,374

[22] Filed: Jul. 10, 1989

[51] Int. Cl.$^5$ ............................................. B65G 53/28
[52] U.S. Cl. ..................................... 406/39; 406/164; 406/166
[58] Field of Search ............... 406/108, 109, 110, 112, 406/122, 127, 153, 154, 159, 164, 166, 168, 173, 176, 196, 39

[56] References Cited

U.S. PATENT DOCUMENTS

| 4,430,028 | 2/1984 | Clayton et al. | 406/166 |
| 4,599,016 | 7/1986 | Medemblik | 406/67 |
| 4,659,262 | 4/1987 | van Aalst | 406/109 |

FOREIGN PATENT DOCUMENTS

| 1238355 | 6/1988 | Canada . | |
| 2237789 | 9/1973 | Fed. Rep. of Germany | 406/166 |
| 470309 | 5/1969 | Switzerland | 406/164 |

OTHER PUBLICATIONS

Walinga Inc., "Pneumatic and Auger Discharge Systems", 03/87.
Christianson Systems Inc., Handlairs 550/555 Handlair 560/660, 1987.
David Manufacturing Company, "Trans-fer 2000", 05/87.
Kongskilde, Cushionair Grain Vacs Series 300,500 and 700.
Neuero Corporation, "Model 675".
Vana Industries, Ltd., Conveyair S.D.
Vana Industries Ltd., Conveyair.
Grain Handler Pneumatic Systems, "Grain Handler".
Dunbar Kapple, "Vac-U-Vator Model 1051/1061", 1984.

Primary Examiner—Sherman Basinger
Assistant Examiner—S. Avila
Attorney, Agent, or Firm—Rogers, Bereskin & Parr

[57] ABSTRACT

Material transfer apparatus comprises a vacuum source for drawing material entrained in a first fluid stream through an inlet conduit into a separation chamber, a valve for transferring material collected in the chamber to an inlet of a first section of an outlet conduit and a pressure source for pushing material entrained in a second fluid stream from the valve and through the outlet conduit. The outlet conduit carries the material entrained in the second fluid stream from the air lock to an elevated material outlet, the conduit comprising the first section and further second and third sections. The substantially rigid first section leads from the air lock to a flexible, curved second section, and a substantially rigid third section leads from the second section to the elevated material outlet. The first and third sections are connected by a hinge member including a locking device for fixing the angle between the first and third sections and permitting the height of the material outlet to be varied. The first section of the boom includes first, second and third portions. A substantially horizontal first portion extends from the valve to an inclined second portion and a substantially upright third portion extends from the second portion. The portions are joined at smooth curves to facilitate the flow of material through the section.

24 Claims, 7 Drawing Sheets

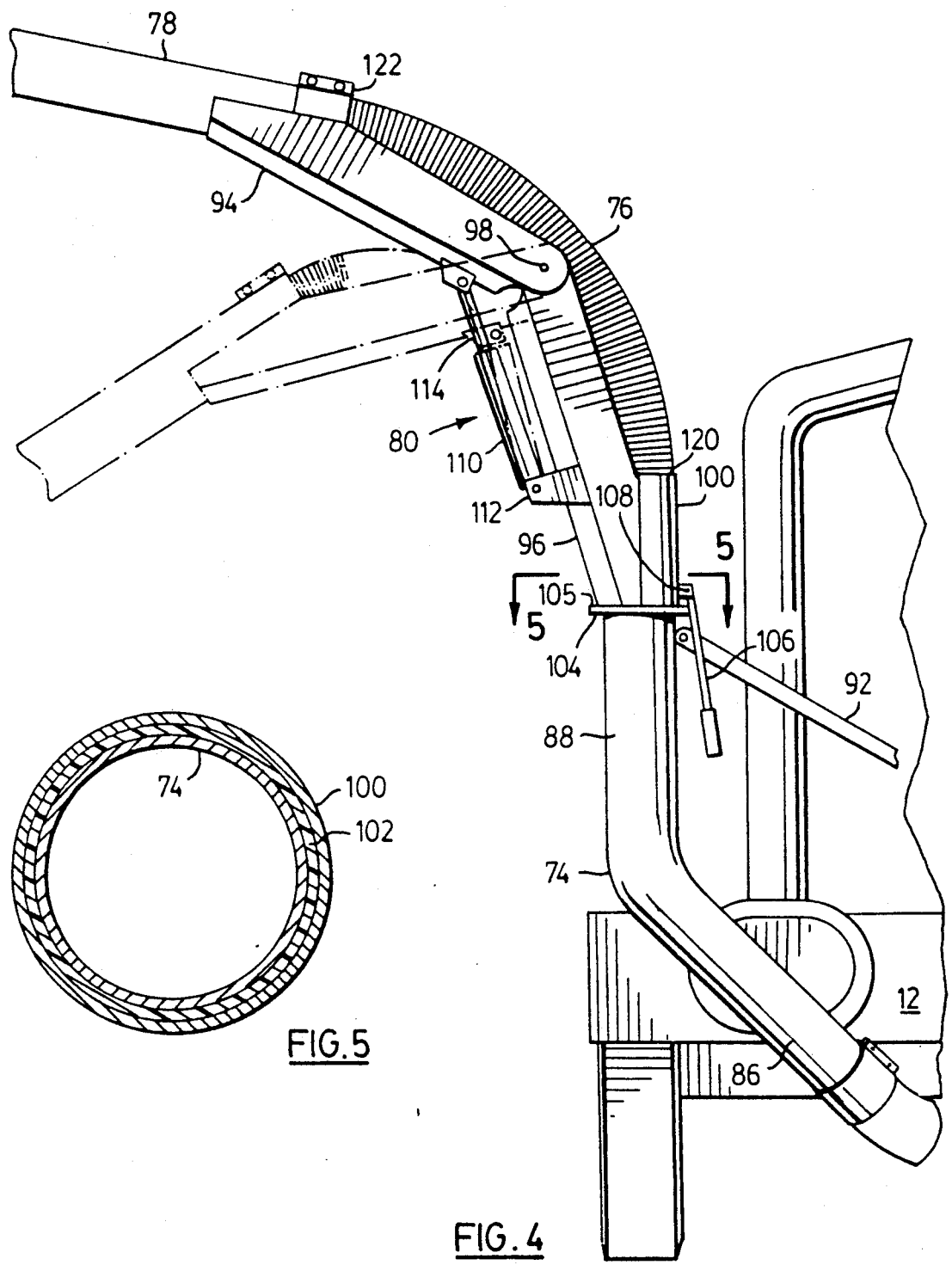

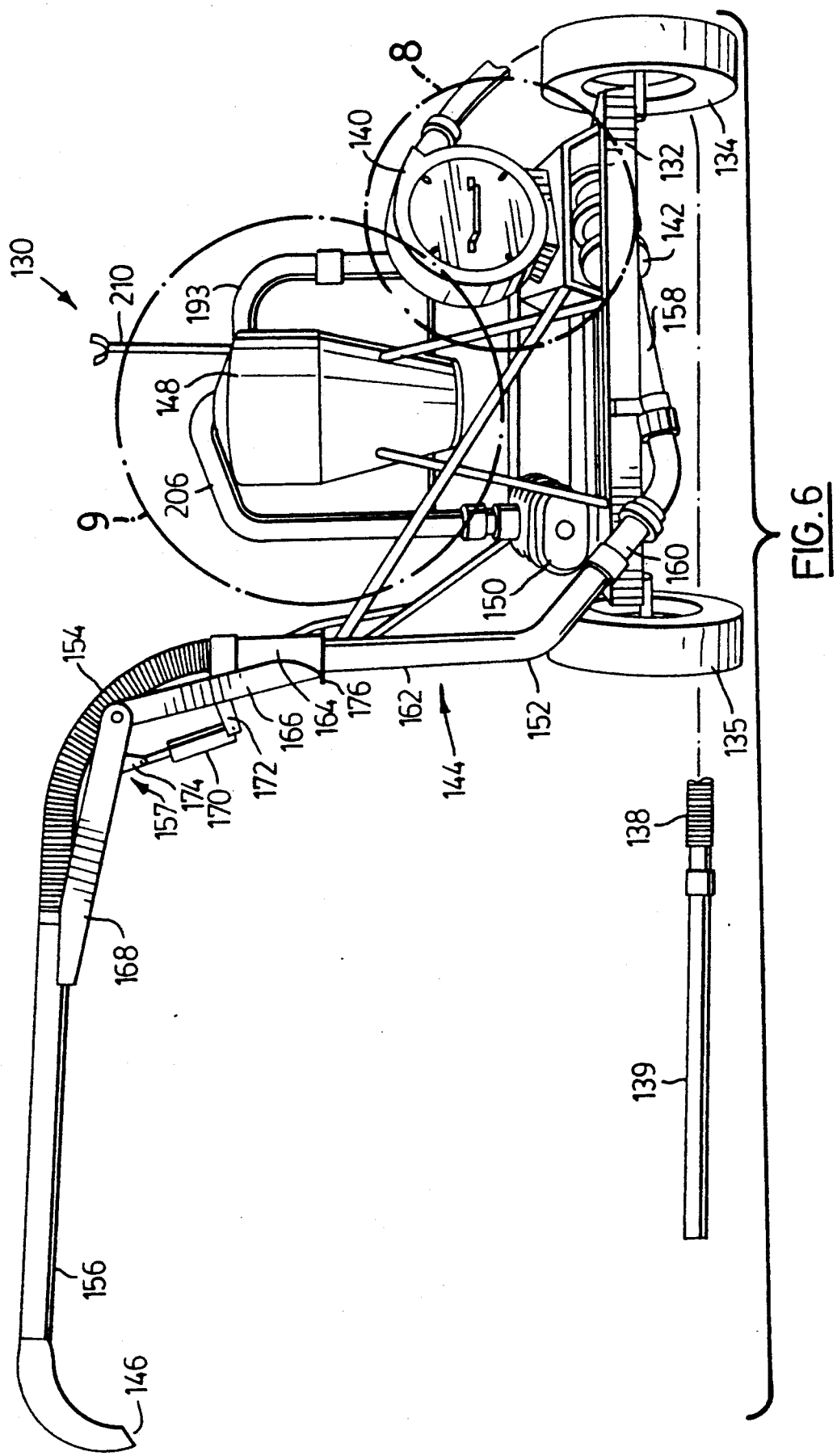

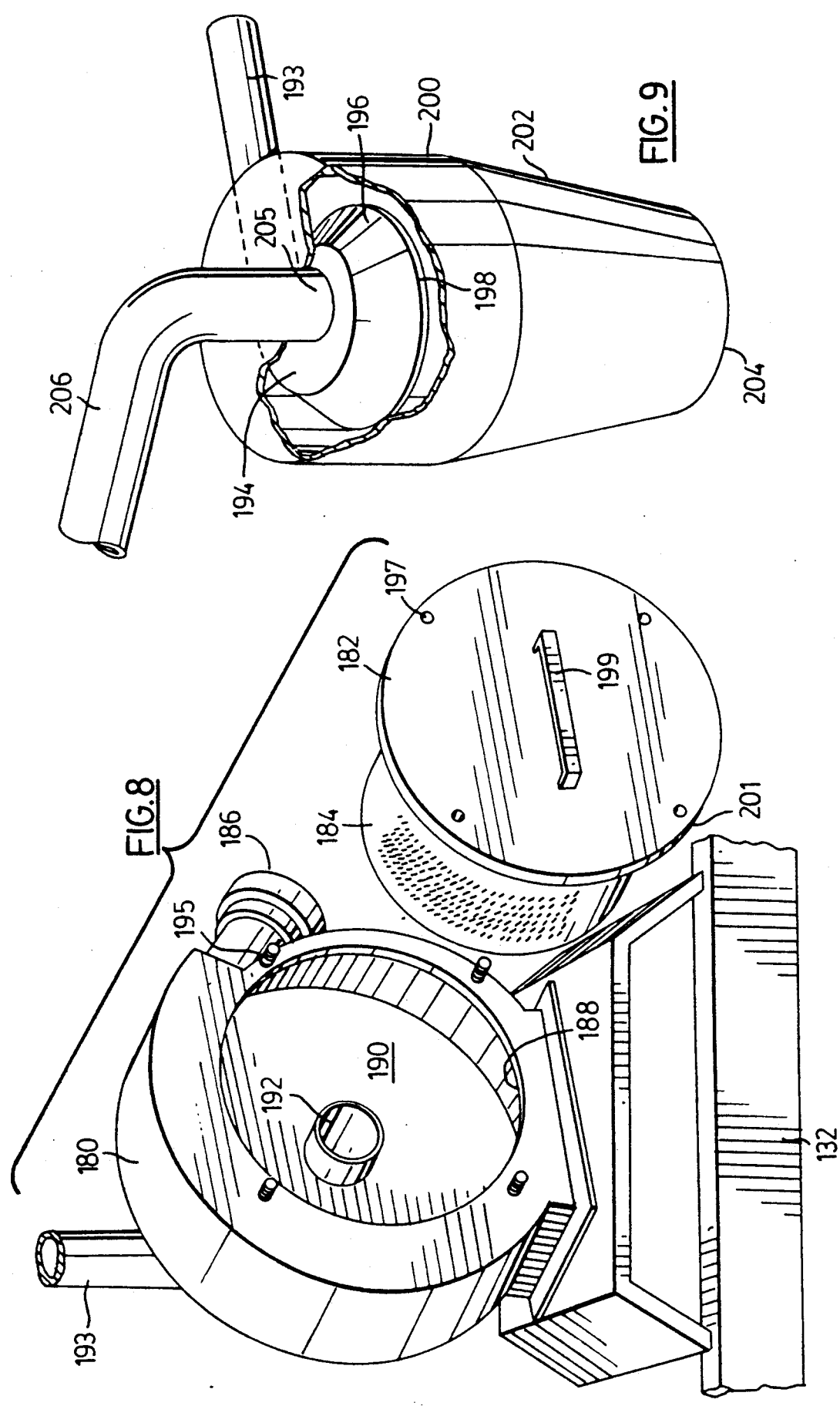

MATERIAL TRANSFER APPARATUS

FIELD OF THE INVENTION

This invention relates to material transfer apparatus, and in particular to pneumatic, granular material conveying systems and to discharge conduit configurations for such systems.

The invention will be described, by way of example, with particular reference to the transfer of grain, though the invention is not limited to this application.

BACKGROUND OF THE INVENTION

On farms, the transfer of granular foodstuffs such as grain, corn kernels, beans, and the like from, for example, a storage bin to a transport trailer, is frequently carried out using a trailer-mounted pneumatic conveying system. A typical conveying system will be mounted on a wheeled frame adapted to be towed behind a tractor, which also provides the power source for the system. The majority of conveyor systems include a vacuum source for drawing the granular material, such as grain, entrained in a first air stream from a first location through a flexible inlet conduit into a cyclone separator. The grain falls to the bottom of the separator while the entraining air passes through an opening in the upper part of the separator leading to the vacuum source. In many existing conveyor systems, the vacuum source is a Rootes-type positive displacement blower, producing a vacuum on the upstream side of the blower, while also, on the downstream side, acting as a pressure source providing a second air stream for pushing the grain from a rotating, vaned valve at the base of the separator. The grain is entrained in this air stream and accelerated from the valve into an outlet conduit, which extends from the valve to an elevated grain outlet. Conveniently, power for the blower is taken through a system of belts from the tractor power take-off, while the rotating valve is driven by a hydraulic motor from the hydraulic system of the tractor.

The ratio of air to entrained grain is important in achieving a smooth flow through the conveyor: if not enough air is present the grain may plug the flexible inlet conduit or the oulet conduit; and if too much air is present the conveyor will operate inefficiently, that is, moving grain at a lower rate than is possible at the optimum air to grain ratio. The amount of air passing through the conveyor is normally controlled by an air valve adjacent the mouth of the inlet conduit.

The optimum operating ratio of air to entrained grain for a particular system is governed by a wide variety of system characteristics, including air "leakage" and internal configuration. Air leakage occurs at various points along the grain path, particularly in the flexible inlet conduit and the outlet conduit, if it includes flexible portions. This is in part due to the use of flexible tubing formed of interlocked stainless steel spirals to form the flexible portions. When new, leakage through the flexible tubing is negligible, however, damage sustained through usage leads to deterioration of the integrity of the tubing, and increased leakage.

As mentioned above, conveyor systems are normally trailer-mounted for easy transporting, or towing, between sites. Accordingly, the system and trailer must conform to public highway width and height restrictions. During grain transfer operations, the boom section of the outlet conduit extends from the trailer to the grain outlet, which may be 12-13' above ground level and a similar distance from the side or rear of the trailer. The boom section must therefore be rectractable for towing. This may be achieved in one of several ways: the outlet conduit may comprise a detachable flexible lower section and rigid upper boom section which may be pivoted to a towing position in which the boom section extends, for example, diagonally across the trailer and is supported by a bracket on an upper portion of the separator, the lower section being detached from the air lock and boom section and stowed on the trailer; or alternatively, the outlet conduit may comprise two hinged rigid sections such that the conduit may be "broken" in two for towing. With the former configuration, the operator must detach and attach the flexible lower section each time the conveyor is moved between sites. The continual handling of the section tends to cause deterioration and the detached section is vulnerable to damage. The latter configuration generally has greater durability but does not permit for height adjustment of the grain outlet, which can present problems, for example, in windy conditions when a lower than average trailer is being loaded.

The overall configuration of the conveyor system on a trailer also influences the form of outlet conduit, as the lower section of boom initially lies horizontally, to receive grain from the air lock at a lower portion of the trailer, and from a horizontal orientation extends to a substantially upright orientation adjacent to the join with the upper boom section. This transition must be accommodated within the restricted dimensions of the trailer.

SUMMARY OF THE INVENTION

According to one aspect of the present invention there is provided an outlet conduit for use in material transfer apparatus, comprising hollow tubing having first, second and third sections. A substantially rigid first section leads from a material inlet to a flexible, curved second section and a substantially rigid third section leads from the second section towards a material outlet. The first and third sections are connected by a hinge member located to the inside of the curve of the second section and the hinge member includes setting means for setting the angle between the first and third sections and thus setting the height of the material outlet.

Preferably, the second section is rotatably connected to the first section and the hinge member is also rotatably connected to the first section permitting the second and third sections to be rotated relative to the first section. Where the outlet conduit forms part of trailer mounted material transfer apparatus, the first section may be fixed while the second and third sections are rotatable from an extended operative configuration in which the third section extends outwardly from the apparatus, to a retracted transport configuration in which the third section extends above and across the apparatus.

In a further aspect of the present invention there is provided a first section of an outlet conduit of hollow tubing for use in material transfer apparatus in which material enters the conduit through a material inlet and is entrained in a fluid stream for transport through the conduit to an elevated material outlet. The conduit section includes first, second and third portions, a substantially horizontal first portion for extending from a material inlet to an inclined second portion, and a substantially upright third portion extending from the second portion.

Preferably, the portions of the first section are joined at smooth curves such that, in use, the absence of sharp corners in the conduit facilitates flow of material through the conduit. Where the conduit forms part of trailer mounted material transfer apparatus, preferably the first and second portions of the conduit extend diagonally across the trailer. The diagonal orientation of the portions permits the use of relatively long horizontal and inclined first and second portions before the upright third portion, which tends to facilitate material flow through the conduit.

BRIEF DESCRIPTION OF THE DRAWINGS

These and other aspects of the present invention will be now described, by way of example, with reference to the accompanying drawings, in which:

FIG. 4 is an enlarged rear view of a portion of the apparatus of FIG. 1 and showing two alternative configurations for the boom section;

FIG. 5 is a sectional view on line 5—5 of FIG. 4;

FIG. 6 is a perspective view of material transfer apparatus in accordance with a second preferred embodiment of the present invention and showing a boom section of the apparatus in an extended configuration;

FIG. 8 is an enlarged, exploded view of area 8 of FIG. 6; and

FIG. 9 is an enlarged, partially sectional view of the area 9 of FIG. 6.

DETAILED DESCRIPTION OF THE PREFERRED EMBODIMENTS

Figure 1:
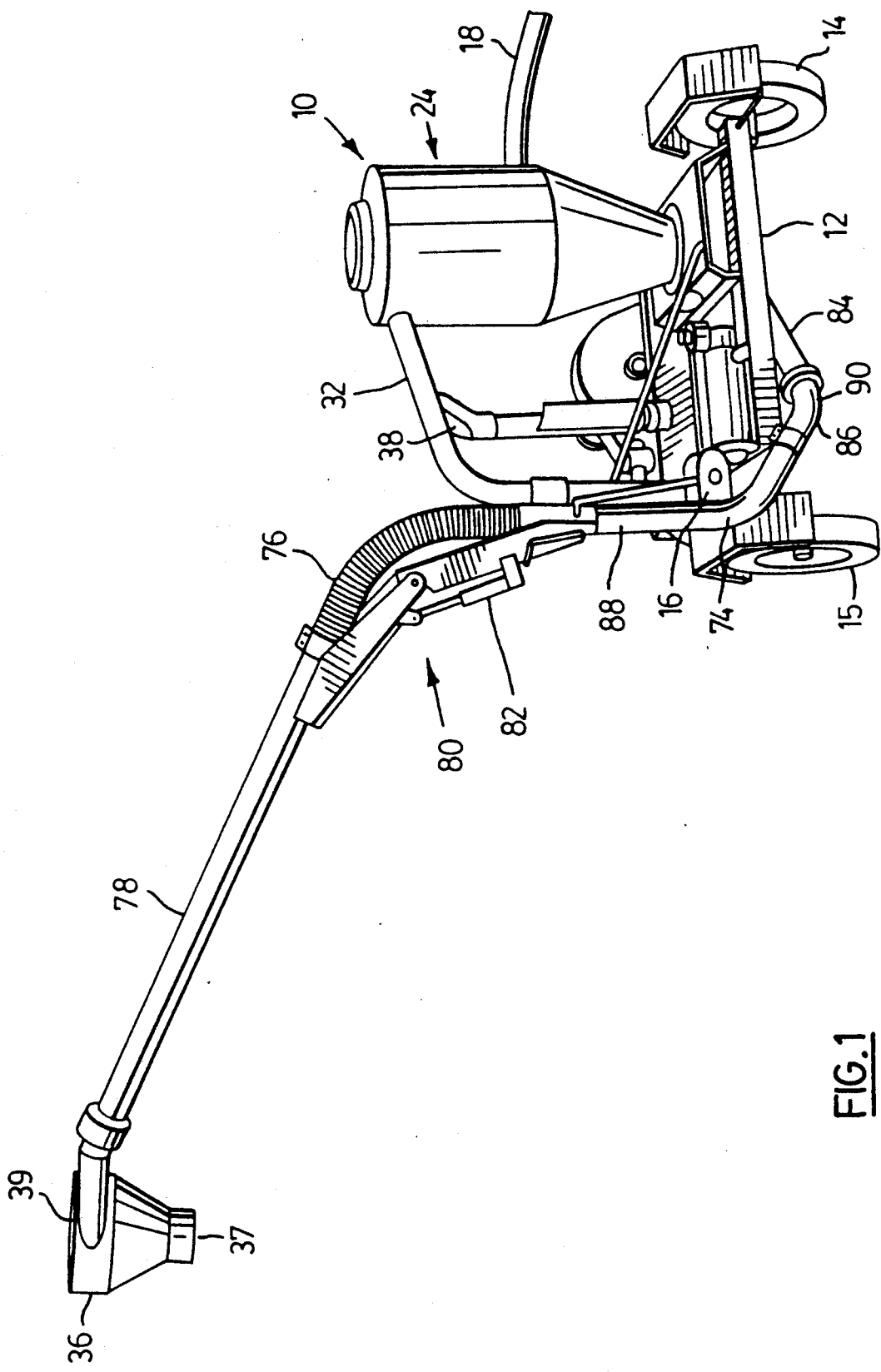
FIG. 1 is a perspective view of material transfer apparatus in accordance with a first preferred embodiment of the present invention and showing a boom section of the apparatus in an extended configuration.

Reference is first made to FIG. 1 of the drawings which shows material transfer apparatus in the form of a trailer-mounted, pneumatic, granular material conveyor 10. In the illustrated configuration, the conveyor 10 is mounted on a frame 12 which extends between ground engaging wheels 14 and 15 and is adapted to be towed by a tractor (not shown) which also provides the power supply for the conveyor 10, as will be described. The conveyor 10 is typically used for transferring granular foodstuffs such as grain, corn kernels, beans and the like from a storage bin to a transport trailer.

Figure 2:
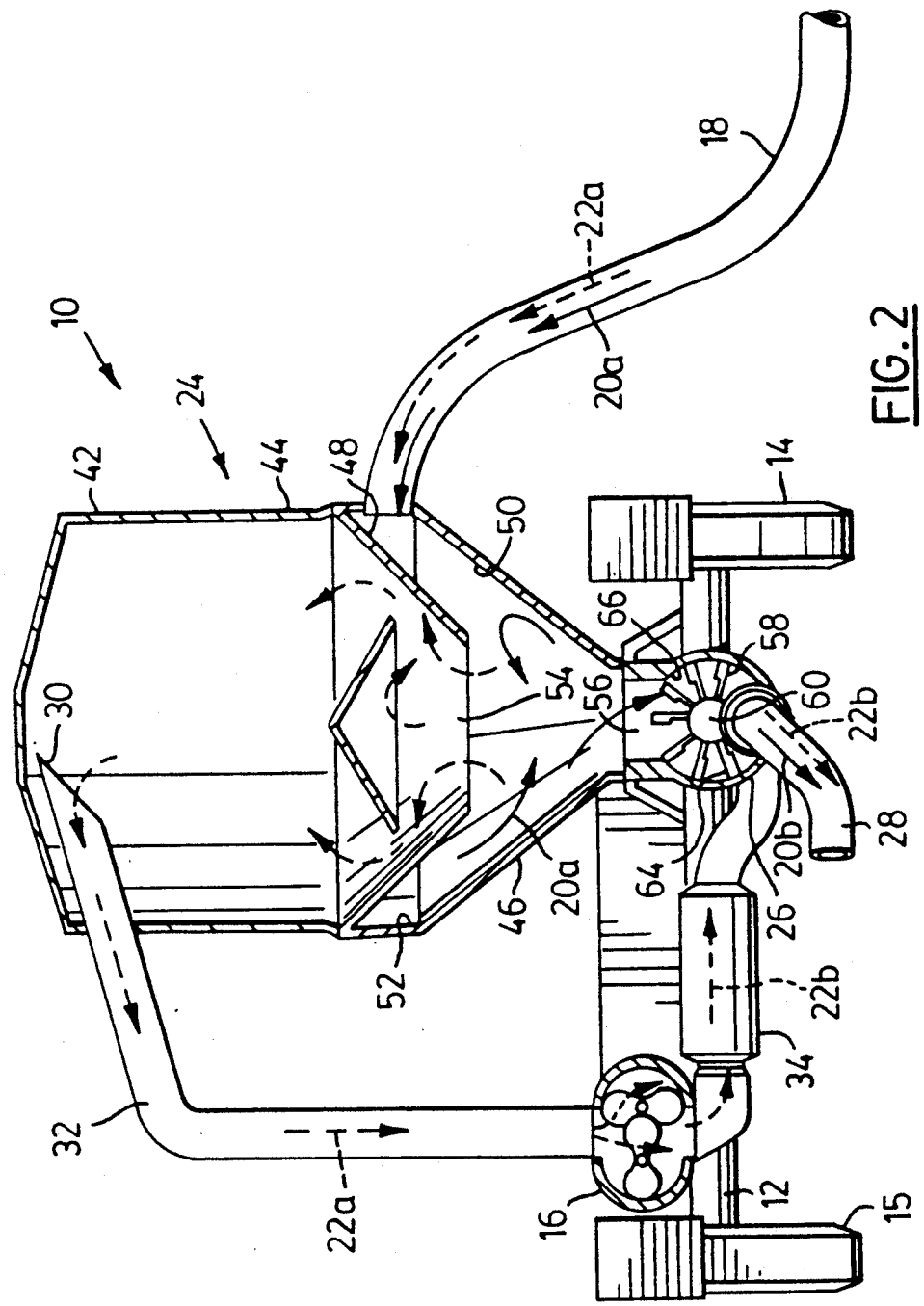
FIG. 2 is a schematic, partially sectioned rear view of the apparatus of FIG. 1.

The operation of the conveyor 10 will initially be described generally with reference to FIGS. 1 and 2 of the drawings, FIG. 2 showing a schematic illustrating of the operation of the conveyor 10. A pneumatic device, in the form of a Rootes or positive displacement type blower 16, acts as a vacuum source to draw air into the conveyor 10 through an inlet conduit 18. An operator locates the open end or nozzle (not shown) of the inlet conduit 18 in, for example, a supply of grain and adjusts an air valve (not shown) such that the grain is entrained in a first fluid stream and drawn into the conduit 18. In FIG. 2, the flow of grain is illustrated by the solid arrows 20, while the air flow is represented as the broken arrows 22, the suffixes a and b being used to indicate whether the air and grain is in an area of negative or positive pressure, respectively. The air 22a and entrained grain 20a pass through the conduit 18 into a separation chamber, in the form of a cyclone separator 24. The grain 20a falls to the bottom of the separator 24 where it gathers and is then transported from the separator 24 through a valve means, in the form of an air sealed, rotary valve 26, into an outlet conduit 28. The air 22a leaves the separator 24 through an upper outlet 30 and passes through a conduit 32 leading to the downstream side of the blower 16. The air 22a is drawn through the blower and pushed, through a muffler 34, to a lower portion of the rotary valve 26. The pressurized air stream 22b then pushes the grain 20b from the lower part of the valve 26, the grain 20b becoming entrained in the air stream 22b and carried through the outlet conduit 28, including a retractable boom section, to an elevated material outlet 36 (FIG. 1), normally positioned above an open transport trailor or the like. In this example, the outlet is provided with a cyclone separator, such that the grain leaves the outlet 36 through a downwardly directed opening 37 while the air and particulate matter entrained in the air leaves the outlet through an upwardly directed opening 39.

The inlet conduit 18 is typically formed of hollow tubing comprising interlocked stainless steel spirals, known as "flextube", and may be provided with one of a variety of detachable nozzles to suit the particular application. In FIG. 1 an exemplary nozzle fitting 38 may be seen mounted on a storage bracket on the conveyor frame 12. The conduit 18 is detachable from the separator 24 for transport and storage and in use is attached to a tangential inlet fitting provided on the separator 24.

The separator 24 comprises a container 42 having an upper portion 44 and a lower cyclone portion 46 defined by a partition 48 provided within the container 42. The lower portion 46 has a frusto-conical shaped lower surface 50, a cylindrical side surface 52 and the downward extending frusto-conical shaped partition 48 which combined to encourage the cyclonic movement of air within the lower portion 46. The partition 48 defines an aperture 54 which allows for communication between the upper and lower portions 44 and 46. The lower surface 50 defines an opening 56 for communication with the rotary valve 26 which in turn communicates with the outlet conduit 28.

During operation of the conveyor, grain 20a is carried by the air stream generated by the partial vacuum, created in the separator 24 by the blower 16, through the conduit 18 to the tangentially oriented inlet. The partition 48 and the lower surface 50 cause the air 22a and grain 20a entering the lower cyclone portion 46 of the container 42 to move in a downward spiral which forces the grain outward toward the lower surface 50, and to be deposited at the opening to the rotary valve 26.

The rotary valve 26 has a plurality of vanes 58 extending radially from a hub 60 which rotates about an axis for moving the grain 20a from the lower portion 46 of the separator 24 into the inlet of the outlet conduit 28. The vanes 58 are provided with flexible or adjustable tips 64 which sealingly engage the inner surface 66 of the valve 26 to provided an air seal between the inlet to the conduit 28 and the lower cyclone portion 46.

As mentioned above, power for the conveyor 10 is supplied by a tractor. If reference is made now also to FIG. 3 of the drawings it will be noted that the frame 12 is provided with a tongue 68 for attaching to a tractor hitch. A drive shaft (not shown) is fitted between the tractor powered-take-off and a coupling mounted on the frame 12, the coupling being fixed to a pulley which drives belts to rotate a smaller pulley coupled to the blower 16. The pulleys and belts are not illustrated in the drawings, though the belt guard 70 may be seen. Drive for the rotary valve 26 is provided by a hydraulic motor coupled to the tractor hydraulic system.

Though not evident from FIG. 2, the rotary valve 26 is mounted diagonally on the frame 12, the outlet conduit 28 extending in line with the valve 26 and diagonally across the frame 12. The outlet conduit 28 comprises three sections, a substantially rigid boom or first section 74 leading from the valve 26 to a flexible, curved second section 76 and a substantially rigid boom or third section 78 leading from the second section 76 towards the outlet 36. The first and third sections 74 and 78 are connected by a hinge member 80 located to the inside of the curve of the second section 76 and the hinge member 80 includes setting means in the form of a hydraulic jack 82 for setting the angle between the first and third sections 74 and 78, and thus setting the height of the outlet 36.

Figure 3:
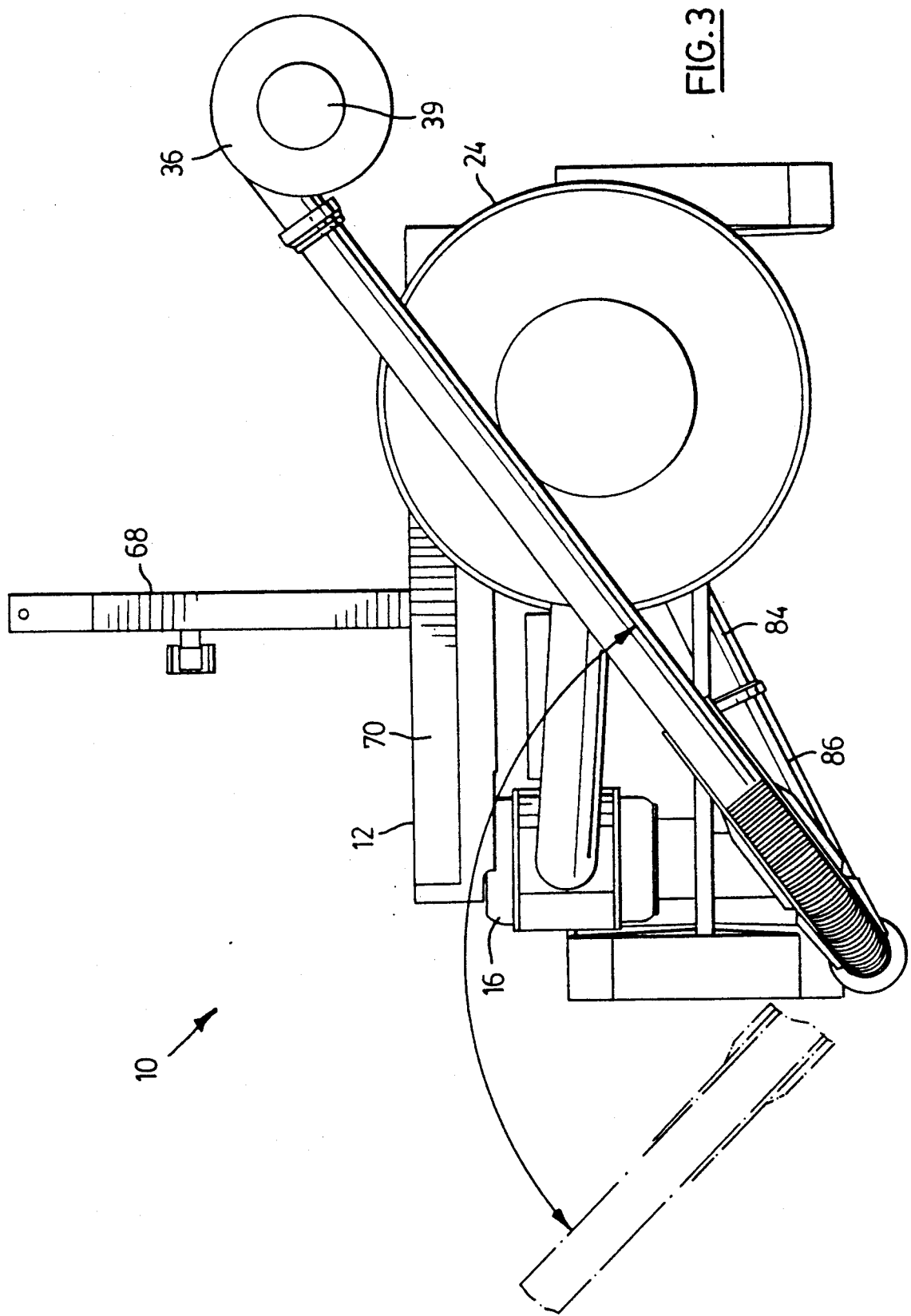
FIG. 3 is a plan view of the apparatus of FIG. 1 and showing the boom section in a retracted configuration and further showing, in ghost outline, the boom section in an extended configuration.
Figure 7:
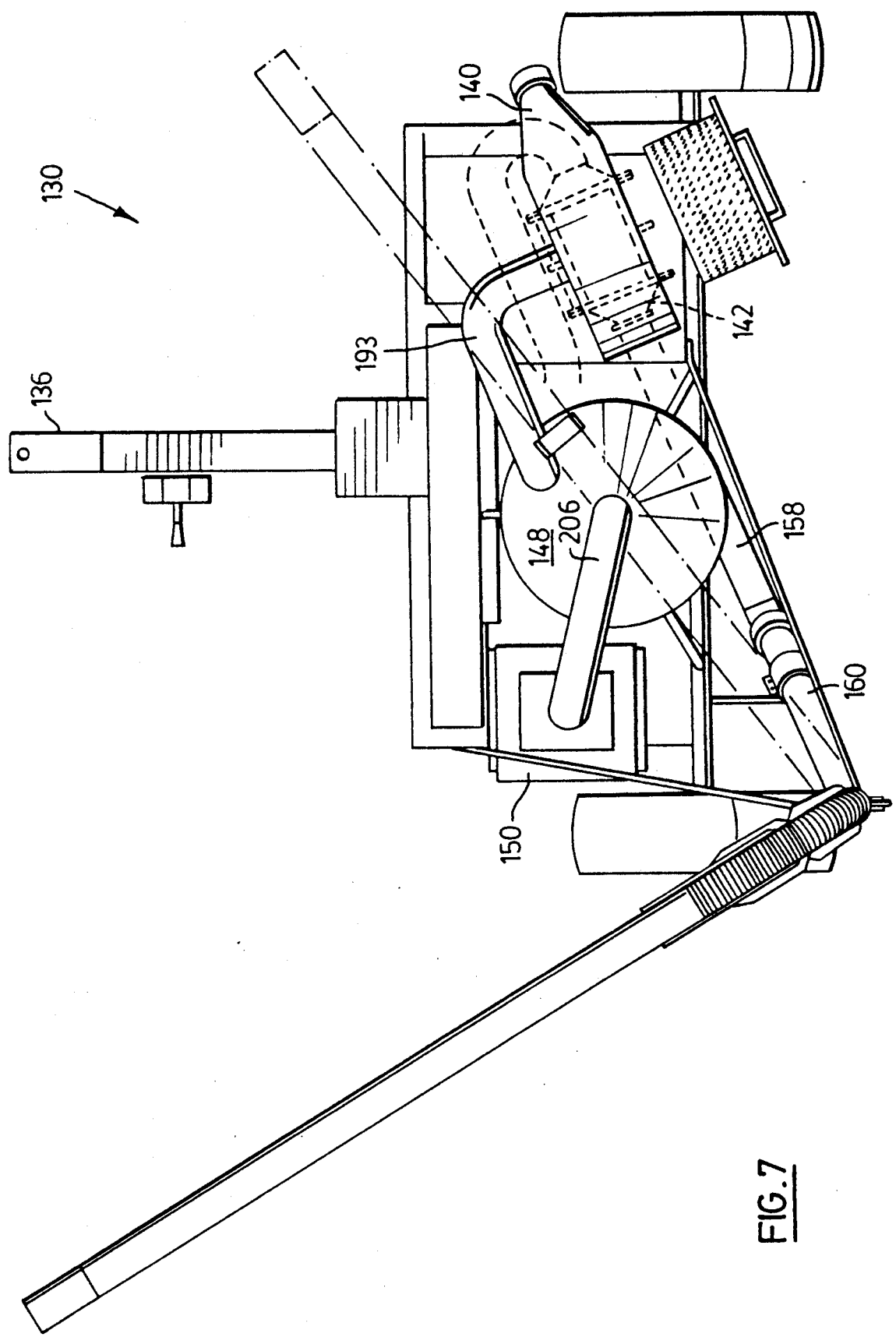
FIG. 7 is a plan view of the apparatus of FIG. 6 including some hidden detail and showing the boom section in an extended configuration and further showing, in ghost outline, the boom section in retracted configuration.

Before describing the hinge configuration of the outlet conduit 28, the first section 74 will be described in more detail. The section 74 includes first, second and third portions, a substantially horizontal first portion 84 extending from the valve 26 to an inclined second portion 86, and a substantially upright third portion 88 which leads into the second section 76 of the conduit. The portions are joined at smooth curves such that there are not sharp turns or corners in the section 74. As may be seen in FIGS. 3 of the drawings, the first and second portions 84 and 86 extend diagonally across the frame 12 from the valve 26 to the right side of the frame 12 (as seen in FIG. 3), across the frame 12 to the rear left hand corner of the conveyor. While not wishing to be bound by theory, it is thought that the relatively long horizontal and inclined portions 84 and 86 of the first section 74 allow the air 22b from the blower 16 to accelerate entrained grain 20b before it encounters the upright third portion 88 and the upwardly inclined and relatively long second and third sections 76 and 78. Tests have indicated that, compared to conventional configurations, this form of conduit increases the mass of material which can be transferred before the outlet conduit becomes blocked with material.

Reference is now made also to FIGS. 4 and 5 of the drawings, which illustrates the area of the outlet conduit where the various sections of the conduit are joined.

If it is desired to transfer grain 20 between two points, but it is not necessary to have the grain coming from the elevated outlet 36, a segment 90 may be removed from the second portion 86 of the first section 74 and a suitable tube or conduit attached to the end of the first portion 84.

The third portion 88 of the first section 74 is provided with bracing members 92 (only one shown) which extends from the frame 12 to points on the third portion 88 below the mounting between the hinge member 80 and the first section 74. The second section 76 is rotatably mounted on the first section 74, as is the hinge member 80, permitting the second and third sections 76 and 78 to be rotated relative to the first section 74.

The hinge 80 is formed of pivotally connected upper and lower members 94 and 96. Both members 94 and 96 are formed as straight sided channels and are connected to one another at two pivot points 98 (only one shown) on the sides of the channels to either side of the second section 76. The upper member 94 is welded to the third section 78, while the lower member 96 is welded to a cylindrical sleeve 100 mounted over the end of the third portion 88 of the first section 74. Located between the sleeve 100 and the upright portion of the first section 74 is a plastic liner, and a section through the sleeve liner 102, sleeve 100, and first section 74, is shown in FIG. 5 of the drawings. The sleeve 100 rests on an annular flange 104, welded to the third portion 88 of the first section 74, the flange 104 resembling a cogwheel when viewed from above, being provided with a plurality of recesses 105 around its outer periphery. These recesses are adapted for receiving a portion of a locking handle 106 which is pivotally mounted on a bracket 108 welded to the sleeve 100 just above the flange 104. By lifting the handle 106 outwardly, an operator can free the second and third sections 76 and 78 for rotation on the first section 74, and using the handle 106 as a lever, rotate the second and third section 76 and 78 and thus reposition the outlet 36.

The height of the outlet 36 is set by the angle between the hinge members 94 and 96, which sets the angle between the first and third sections 74 and 78. Positioning of the members 94 and 96 is controlled by a jack in the form of hydraulic piston and cylinder arrangement, the cylinder 110 being pivotally mounted on a bracket 112 welded to the outer side of the lower member 96 and the piston rod 114 being pivotally connected to a bracket 116 welded to the upper member 94. Hydraulic couplings (not shown) connect the cylinder 100 to the hydraulic system of the tractor.

The movement between the first and third sections 74 and 78 is made possible, in part, by the flexibility of the second sections 76, which is preferably formed of flexible tubing formed of interlocked stainless steel spirals, known as flextube. The second section 76 is mounted to the respective upper and lower ends of the first and third section 74 and 78 by means of cylindrical clamps 120 and 122.

In use, the outlet conduit 28 is positioned as shown in FIG. 1 with the boom or third section 78 of the conduit 28 extending outwardly from the trailer and with the outlet 36 raised, however to transport or store the conveyor it is necessary that the conveyor assumes a more compact configuration. To achieve this the operator releases the handle 106 and rotates the second and third sections 76 and 78 to a position such that the third section 78 overlies the trailer, as is illustrated in FIG. 3. The jack is also used to lower the third section 78 to a lower height, where the section 78 may rest on a supporting bracket provided on the separator 24. FIG. 4 includes an illustration, in ghost outline, of the third section and hinge 80 in a lowered configuration.

To enable a further reduction in the width of the trailer, the outlet 36 is removably mounted on the end of the third section 78 such that it may be removed from the conduit 28 and stored on the trailer.

The apparatus described above with reference to FIGS. 1 through 5 is one example of an application of the present invention and a further preferred embodiment is illustrated in the accompanying FIGS. 6 through 9. This second illustrated embodiment performs substantially the same function as the first described embodiment, and utilises a similar blower and rotary valve arrangement which will not therefore be described again in detail.

Referring first to FIG. 6 of the drawings, the conveyor 130 is mounted on a support frame 132 which extends between ground engaging wheels 134 and 135 and is adapted to be towed by a tractor (not shown). If reference is made also to FIG. 7 of the drawings, it will be noted that the frame 132 is generally rectangular and is provided with a tongue 136 for attaching the conveyor to the hitch of a tractor. As with the first described embodiment, power for the conveyor 130 is supplied by a tractor from the tractor power take-off and the hydraulic system of the tractor.

Granular material, for example grain, is entrained in an air stream and drawn through a flexible inlet conduit 138 (shown provided with a rigid nozzle fitting 139) into a first separator 140 in which a screen filter separates the grain from the air and particulate matter entrained with the air. The grain passes through a rotary valve 142 to an outlet conduit 144 which leads to an elevated material outlet 146. The air and particulate matter are drawn from the first separator 140 into a second separator 148 where cyclonic action separates the particulate matter from the air which continues to a positive displacement type blower 150. From the downstream or positive pressure side of the blower 150 the air is directed through the rotary valve 142 where it entrains the grain and carries it through the outlet conduit 144 to the outlet 146. As with the first described preferred embodiment, the rotary valve 142 is mounted diagonally in the frame 132, in line with the first portion 158 of the first section 152 of the outlet conduit 144.

The outlet conduit 144 is of substantially similar configuration to the outlet conduit 28 of the first described embodiment, having a substantially rigid first section 152 leading from the rotary valve 142 to a flexible, curved second section 154 and a substantially rigid third section 156 which leads from the second section 154 to the material outlet 146, which is in the form of a curved channel. The first and third members are joined by a hinge 157. The first section 152 comprises a substantially horizontal first portion 158 extending from the rotary valve 142 to an inclined second portion 160 and a substantially upright third portion 162. As is perhaps best seen in FIG. 7, the first separator 140 and the rotary valve 142 are located at one side of the frame 132 and the first and second portions 158 and 160 of the first section 152 extend across and rearwardly of the frame to the rear corner of the trailer.

The hinge 157 joining the first and third sections 152 and 156 comprises a sleeve 164 which is located over the upper end of the third portion 162 and is rotatable thereon, and a lower hinge member 166 attached to the sleeve 164 and pivotally connected to an upper hinge member 168 attached to the third section 156. The setting of the hinge 157 is controlled by means of a hand operated hydraulic jack 170 pivotally mounted on brackets 172, 174 welded to the respective hinge members 166 and 168.

The sleeve 164 rests on a cog-shaped, annular flange 176 welded to the third portion 162 of the first section 152, and a handle 178 pivotally mounted to the sleeve 164 is adapted for engaging recesses in the flange 176 and can be used by the operator to rotate the second and third sections 154, 156.

Reference is now also made to FIG. 8 of the drawings which shows an exploded view of the first separator 140. As may be seen from FIG. 8, the separator 140 is substantially drum-shaped and comprises a main body 180 and a front cover 182 provided with a cylindrical filter member 184. The filter member 184 partitions the separator 140 into an outer annular portion and an inner cylindrical portion. The outer annular portion defines a unobstructed path for the grain which enters the separator 140 through a tangential inlet 186, from the inlet conduit 138, and leaves through a grain outlet 188 provided at the base of the separator 140 in communication with the rotary valve 142. Thus, the grain drawn into the separator 140 passes around the outside of the filter member 184 and through the outlet 188 into the valve 142. The rear wall 190 of the separator 140 is provided with a centrally located air outlet 192, in communication with a conduit 193 leading to the second separator 148. The filter member 184, formed of apertured stainless steel or aluminum sheet, separates the granular matter from the air such that only air and smaller particles are drawn from the first separator through the conduit 193. To facilitate cleaning of the separator 140, the filter member 184 is secured to the cover 182 which is easily removed from the main body 180 by releasing a number of fasteners provided on bolts 195 for extending from the main body 180 through corresponding holes 197 in the cover 182. A handle 199 is provided on the outer face of the cover 182 and a gasket 201 is provided on its inner face for forming a seal with the corresponding engaging surface of the body 180.

As described above, the first separator 140 serves as a primary cleaner for the air stream which moves through the conduit 193 and into the second separator 148, which is intended remove the dust and abrasive particles which are harmful to the air moving components of the blower 150.

The second separator 148 is shown in more detail in FIG. 9 of the drawings and provides a cyclonic separator comprising an intake 194 leading tangentially into a cyclone forming means comprising opposed frusto-conical members 196 (only upper member visible) joined at the respective bases defining a continuous slot or plurality of ports 198. The separator includes an enclosing container 200 having an inverted, frusto-conical lower portion 202 which collects and retains particles expelled through the slot or ports 198. The container 200 has a detachable bottom plate 204 which may be removed to expell particles which are collected in the container 200. The clean air is drawn from the centre of the members 196 through outlet 204 to a conduit 206 leading to the blower 150.

Air is directed into the separator 148 in a swirling path which causes the particles carried by the air stream to be separated therefrom by centrifugal force caused by the differences in angular momentum between the particles and the air molecules. Thus, due to the cyclonic movement of air and particles with the separator 148, the particles are forced outward through the slot or ports 198 and into the container 200.

As with the first described embodiment, when in use the third section 156 of the outlet conduit 144 is positioned to extend outwardly from the trailer and with the outlet 146 elevated. For transport or storage, the operator releases the handle 178 and rotates the second and third sections 154 and 156 to a position such that the third section 156 overlies the trailer, as is illustrated in ghost outline in FIG. 7. The jack 82 is also used to lower the third section 156 to rest of a supporting bracket 210 (FIG. 6) provided on the second separator 148.

It may be seen that the two embodiments of the present invention described above provide for convenient material transfer and in particular provide for outlet conduit configurations which are easily adapted to change the height and location of the material outlet and are easily moved between use and transport or storage configurations, and an outlet conduit configuration which allows for smoother material flow.

Those skilled in the art will realise that the embodiments described above are merely exemplary and that apparatus in accordance with the invention may be used in a wide variety of applications where granular or particulate is to be transported. For certain applications it may be desired to provide an independent power source for the apparatus or to replace the positive displacement type blowers with fans, and these and other obvious modifications are intended to be within the scope of the present invention.

We claim:

1. An outlet conduit for use in material transfer apparatus comprising hollow tubing and having:
   a) first, second and third sections, the substantially rigid first section leading from a material inlet to the flexible, curved second section, the second section being rotatably connected to an upright end portion of the first section and the substantially rigid third section leading from the second section towards a material outlet;
   b) a hinge member connecting the first and second sections, the hinge member comprising a first member extending from the first section and a second member extending from the third section, the first and second members being pivotally connected at two pivot points located laterally of the second section the members being configured to permit positioning of the second section between said pivot points, and the first member including a sleeve portion rotatably mounted on an end portion of the first section; and
   c) setting means for setting the angle between the first and third sections.

2. The outlet conduit of claim 1 wherein the setting means is in the form of an extendible link extending between the first and second members of the hinge member.

3. The outlet conduit of claim 1 wherein the first section includes substantially straight first, second and third portions, the substantially horizontal first portion extending from a material inlet to the inclined second portion and the substantially upright third portion extending from the second portion.

4. The outlet conduit of claim 3 wherein the first and second portions and the second and third portions of the first section are joined at smooth curves.

5. Material transfer apparatus comprising input means for drawing material through an inlet conduit into a first chamber, outlet means for transferring material from the chamber to an inlet of a first section of an outlet conduit, and a fluid pressure source for creating a fluid stream for entraining and carrying material from the inlet of the first section and through the outlet conduit to carry material entrained in the fluid stream from the outlet means to an elevated material outlet, the outlet conduit comprising said first section and further second and third sections, the substantially rigid first section leading from the outlet conduit inlet to the flexible curved second section, the second section being rotatably connected to an upright end portion of the first section, and the substantially rigid third section leading from the second section to the elevated material outlet, the first and third sections being connected by a hinge member rotatably connected to the first section and the substantially rigid third section leading from the second section to the elevated material outlet, the first and third sections being connected by a hinge member rotatably connected to the first section and including setting means for fixing the angle between the first and third sections, whereby the third section may be inclined relative to the first section and the second and third sections may be rotated relative to the first section.

6. The material transfer apparatus of claim 5 wherein the hinge member is located to the inside of the curve of the second section and including setting means for setting the angle between the first and third sections.

7. The material transfer apparatus of claim 6 wherein the hinge member comprises a first member extending from the first section and a second member extending from the third section, said members being pivotally connected.

8. The material transfer apparatus of claim 7 wherein the setting means is in the form of an extendible link extending between the first and second members of the hinge member.

9. The material transfer apparatus of claim 7, wherein said first member includes a sleeve portion rotatably located on an end portion of the first section.

10. The material transfer apparatus of claim 9, wherein said first and second members are pivotally connected at two pivot points located laterally of the second section, one to each side of the second section, and said first and second members are configured to allow positioning of the second section between said pivot points.

11. The material transfer apparatus of claim 10 wherein the first section includes substantially straight first, second and third portions, the substantially horizontal first portion extending from the outlet conduit inlet to the inclined second portion, and the substantially upright third portion extending from the second portion.

12. The material transfer apparatus of claim 11 wherein the portions of the first section are joined at smooth curves.

13. Material transfer apparatus comprising a vacuum source for drawing material entrained in a first fluid stream through an inlet conduit into a first material separation chamber, valve means for transferring material collected in the chamber to an inlet of a first section of an outlet conduit, and a fluid pressure source for pushing material entrained in a second fluid stream from the valve means and through the outlet conduit to an elevated material outlet, the outlet conduit comprising said first section and further second and third sections, the substantially rigid first section leading from the valve means to the flexible curved second section, the second section being rotatably connected to an upright end portion of the first section and the substantially rigid third section leading from the second section to the elevated material outlet, the first and third sections being connected by a hinge member rotatably connected to the first section and including setting means for fixing the angle between the first and third sections, whereby the third section may be inclined relative to the first section and the second and third sections may be rotated relative to the first section.

14. The material transfer apparatus of claim 13 wherein the vacuum source and the fluid pressure source are a single pneumatic device for producing a partial vacuum on a upstream side of the device and a positive pressure on the downstream side of the device.

15. The material transfer apparatus of claim 14 wherein the first material separation chamber is located between the inlet conduit and the pneumatic device and is adapted to remove granular material from the inlet fluid stream.

16. The material transfer apparatus of claim 15 wherein the first material separation chamber is in the form of a cyclone separator having an inlet for the first fluid stream and the associated entrained material, a material outlet at a lower portion of the cyclone leading to the outlet means and a fluid outlet at an upper portion of the cyclone leading to the pneumatic device.

17. The material transfer apparatus of claim 16 wherein the valve means comprises an airsealed rotary valve having a plurality of vanes extending radially from a hub, said vanes causing movement of granular matter from the material outlet of the cyclone separator to a duct opening into the bottom portion of the rotary valve downstream of the pneumatic device and in communication with the inlet of the first section of the outlet conduit.

18. The material transfer apparatus of claim 15 wherein the first chamber has an inlet for the first fluid stream and the associated entrained material, a material outlet at a lower portion of the chamber leading to the outlet means and a fluid outlet, the fluid outlet being separated from the inlet and the material outlet by a filter member.

19. The material transfer apparatus of claim 18 wherein the first chamber is cylindrical and is partitioned by the filter member to define an annular outer chamber providing substantially communication between the inlet and the material outlet and a cylindrical inner chamber in communication with the fluid outlet.

20. The material transfer apparatus of claim 19 and further including a second chamber provided between the first chamber and the pneumatic device adapted for separating particulate material from the fluid stream from the first chamber.

21. The material transfer apparatus of claim 20 wherein the second chamber has an inlet for particulate containing fluid within the upper portion of the chamber, the intake leading tangentially into a cyclone forming means, said means having opposed frusto-conical members joined at their respective bases so as to define a slot or a plurality of ports about the circumference of the means at the area of the join, a container enclosing the cyclone means for collecting particles ejected from the cyclone, and an outlet for cleaned fluid leaving the cyclone means.

22. Portable material transfer apparatus comprising a support frame provided with ground engaging wheel means mounted to the sides of the frame, input means for drawing material through an inlet conduit into a first chamber, outlet means for transferring material in the first chamber to an inlet of a first section of an outlet conduit located at one side of the frame and a pressure source for creating a fluid stream for entraining and carrying material from the outlet conduit inlet, through the outlet conduit, to the other side of the frame and an elevated material outlet, wherein the outlet conduit includes a first section extending diagonally across the frame from the air lock and having substantially straight first, second and third portions, the substantially horizontal first portion extending from the inlet to the inclined second portion, and the substantially upright portion extending from the second portion.

23. Portable material transfer apparatus comprising a support frame provided with ground engaging wheel means mounted to the sides of the frame, a vacuum source for drawing material entrained in a first fluid stream through an inlet conduit into a first chamber, an air lock located to one side of the frame for transferring material in the first chamber to an inlet of a first section of an outlet conduit and a pressure source for pushing material entrained in a second fluid stream from the air lock through the outlet conduit to carry material entrained in the second fluid stream from the air lock to the other side of the frame and an elevated material outlet, wherein the outlet conduit includes a first section extending diagonally across the frame from the air lock to the other side of the frame and having first, second and third portions, the substantially horizontal first portion extending from the inlet to the inclined second portion, and the substantially upright portion extending from the second portion.

24. Material transfer apparatus comprising:
a vacuum source provided by a pneumatic device for producing a partial vacuum on an upstream side of the device for drawing material entrained in a first fluid stream through an inlet conduit into a first material separation chamber located between the inlet conduit and the pneumatic device adapted to separate granular material from the inlet fluid stream;
valve means for transferring material collected in the chamber to an inlet of a first section of an outlet conduit, the pneumatic device producing a positive pressure on the downstream side of the device for pushing material entrained in a second fluid stream from the valve means and through the outlet conduit to an elevated material outlet;
a second chamber provided between the first chamber and the pneumatic device for separating particulate matter from the fluid stream from the first chamber;
the first material separation chamber being cylindrical and having an inlet for the first fluid stream and associated entrained material, a material outlet at a lower portion of the chamber leading to the valve means and the outlet conduit, a fluid outlet separated from the inlet and the material outlet by a screen partitioning the first chamber to define an annular outer chamber providing communication between the inlet and the material outlet, and a cylindrical inner chamber in communication with the fluid outlet;
the second chamber having an inlet for particulate containing fluid for fluid communication with the fluid outlet of the first chamber within the upper portion of the second chamber, the inlet leading tangentially into a cyclone means, said cyclone means having frusto-conical members joined at their respective bases so as to define a slot or a plurality of ports about the circumference of the cyclone means of the area of the join, a container enclosing the cyclone means for collecting particles ejected from a cyclone, and an outlet for cleaned fluid leaving the cyclone means;

the outlet conduit comprising said first section and further second and third sections, the substantially rigid first section leading from the valve means to the flexible second section, and the substantially rigid third section leading from the second section to the elevated material outlet, the first and third sections being connected by a hinge member including setting means for fixing the angle between the first and third sections.

* * * * *